(12) United States Patent
Larisch et al.

(10) Patent No.: US 7,467,246 B2
(45) Date of Patent: Dec. 16, 2008

(54) SECURE LOCAL NETWORK

(75) Inventors: Markus Larisch, Schermbeck (DE); Rainer Bego-Ghina, Bochum (DE); Harald Krause, Hattingen (DE)

(73) Assignee: Delphi Technologies, Inc., Troy, MI (US)

( * ) Notice: Subject to any disclaimer, the term of this patent is extended or adjusted under 35 U.S.C. 154(b) by 323 days.

(21) Appl. No.: 11/355,704

(22) Filed: Feb. 16, 2006

(65) Prior Publication Data

US 2006/0190648 A1 Aug. 24, 2006

(30) Foreign Application Priority Data

Feb. 16, 2005 (EP) .................. 05003314
Mar. 18, 2005 (EP) .................. 05006013

(51) Int. Cl.
*G06F 13/00* (2006.01)
(52) U.S. Cl. .................. 710/110; 710/200; 710/305
(58) Field of Classification Search .................. 710/107, 710/108, 110, 115, 305, 306, 313, 200; 713/182; 701/36
See application file for complete search history.

(56) References Cited

U.S. PATENT DOCUMENTS

| | | | |
|---|---|---|---|
| 6,145,082 A | 11/2000 | Gannon et al. | |
| 6,314,351 B1 | 11/2001 | Chutorash | |
| 6,871,250 B2 * | 3/2005 | Froeschl et al. | 710/110 |
| 6,990,540 B2 * | 1/2006 | Dalakuras et al. | 710/110 |
| 7,047,342 B2 * | 5/2006 | Krug et al. | 710/305 |
| 7,106,793 B2 * | 9/2006 | Spichale | 375/238 |
| 7,269,675 B2 * | 9/2007 | Dalakuras et al. | 710/107 |

FOREIGN PATENT DOCUMENTS

| | | |
|---|---|---|
| DE | 10254285 | 6/2004 |
| EP | 1309132 | 5/2003 |

OTHER PUBLICATIONS

LIN Bus and Its Potential for Use in Distributed Multiplex Applications, DeNuto et al., 2001.*
The LIN Bus, Cost Reduced Bus With Latency Guaranteed, EBVElectronik, undated.*
LIN Bus Emerging Standard for Body Control Apps, undated.*
LIN Bus Transceiver (L9638), STMicroelectronics, 2004.*
Definition of LIN Bus from Wikipedia, undated.*

* cited by examiner

*Primary Examiner*—Khanh Dang
(74) *Attorney, Agent, or Firm*—David W. Wood

(57) ABSTRACT

A local network comprises at least one master and a plurality of slaves which can be controlled by the master via a data bus, with at least one slave being arranged in an unprotected region and at least one slave being arranged in n protected region. In this connection, data originating from a respective slave in the unprotected region can admittedly be transmitted via the data bus to the master, but not to any slave in the unprotected region.

9 Claims, 4 Drawing Sheets

SECURE LOCAL NETWORK

FIELD OF THE INVENTION

The invention relates to a local network, in particular for vehicles, comprising at least one master and a plurality of slaves which can be controlled by the master via a data bus, with at least one slave being arranged in a protected region, e.g. inside the vehicle, and at least one slave being arranged in an unprotected region, e.g. at the outside of the vehicle.

BACKGROUND OF THE INVENTION

So-called LIN (local interconnect network) data buses are increasingly being used, in particular in vehicles, which are each provided between a central unit (master) and a plurality of control units (slaves) and, for example, serve for the transmission of commands for the actuation of a central locking system of the vehicle, of window regulators, for the opening and closing of the vehicle, etc.

In this connection, a respective command is available on the total data bus. The data bus is, however, an electrical lead which has to be protected against manipulation from outside. The leading of a data bus out of a vehicle (for example to a side mirror) thus in particular represents a safety risk. Non-authorized commands can namely be introduced from such an unprotected region of the data bus accessible from the outside which, for example, effect an opening of the central locking system or an actuation of the window regulators. A separate data bus could admittedly be used e.g. for the mirror adjustment or the data could be encoded. Solutions of this type would, however, be relatively cost-intensive.

Another potential means to prevent unauthorized commands and to ensure a corresponding protection from theft and break-in, might include guiding a respective separate data line from the master to a respective slave at risk of manipulation. Such an additional data line at the master module, however, brings along a relatively high hardware effort and software effort. In such a case, each LIN transceiver would thus have to be connected to a serial interface at the master or at a microcontroller associated therewith and the corresponding software would have to be worked through, which would require additional computer power for the microcontroller.

SUMMARY OF THE INVENTION

It is the underlying object of the invention to provide an improved network of the initially named kind, wherein the data bus is reliably protected against manipulations originating from the unprotected region with as low an effort as possible and thus correspondingly cost favorably.

This object is satisfied in accordance with the invention in that data originating from a respective slave in the unprotected region may be transmitted via the data bus to the master, but not to any slave in the protected region. For example, in an exemplary embodiment, the master may be coupled with the slaves via two transceivers such that data originating from a respective slave in the unprotected region can admittedly be transmitted to the master, but not to any slave in the protected region.

It is precluded in a simple manner on the basis of this embodiment that data originating from a respective slave in the unprotected region are transmitted to any slave in the protected region. Manipulations originating from the unprotected region are thus suppressed in a simple and reliable manner.

In an exemplary embodiment, respective directional data traffic is preferably possible between the slave and the master irrespective of whether a respective slave is arranged in the protected region or in the unprotected region.

In accordance with this embodiment, the data flow between the master and the different slaves can expediently be controllable via a logic circuit, in particular a digital logic circuit. This logic circuit is designed such that a data flow starting from a respective slave in the unprotected region to any slave in the protected region is precluded.

The logic circuit may, in each case, be coupled to the master, to one or more slaves in the protected region and to one or more slaves in the unprotected region via a transceiver. An arrangement is therefore conceivable, for example, of three transceivers and a logic circuit which forwards the messages accordingly or suppresses a data flow from a respective slave in the unprotected region to any slave in the protected region.

An extremely simple expedient embodiment of the local network in accordance with the invention is characterized in that the master is connected via an electronic circuit to at least one slave in the protected region, on the one hand, and to at least one slave in the unprotected region, on the other hand, and in that the electronic circuit is designed such that a data flow starting from a respective slave in the unprotected region to any slave in the protected region is precluded.

If one leaves apart the fact that no slave-to-slave communication can take place from the unprotected region to the protected region, a solution of this type can, for example, again also satisfy the requirements with respect to the LIN protocol 2.0. The effort is minimal, which brings along correspondingly low costs, particularly since the electronic circuit can expediently be integrated in a plug. The data bus can in particular include a single wire bus system.

In a preferred practical embodiment of the local network in accordance with the invention, a LIN (local interconnect network) data bus is provided as the data bus.

In another exemplary embodiment, the master may be coupled with the slaves via the two transceivers such that respective bidirectional data traffic is possible between the slave and the master irrespective of whether a respective slave is arranged in the protected region or in the unprotected region.

In a preferred practical embodiment of the local network in accordance with the invention, one of the two transceivers is directly coupled with the slave or slaves in the protective region and the other transceiver is directly coupled with the slave or slaves in the unprotected region.

In this connection, the two transceivers are expediently connected to one another such that data can be transmitted from a respective slave in the protected region to any slave in the unprotected region, whereas a data flow originating from a respective slave in the unprotected region to any slave in the protected region is precluded.

In a preferred practical embodiment of the local network in accordance with the invention, a data output of the master is connected to a data input of the one transceiver directly coupled with the slave or slaves in the protected region, a data output of this transceiver is connected to a data input of the other transceiver directly coupled with the slave or slaves in the unprotected region and a data output of this transceiver is connected to a data input of the master.

In this process, the network is preferably designed so that the transceiver directly coupled with the slave or slaves in the protected region forwards the data received at its respective data input and transmitted by the master to the slave or slaves in the protected region, so that both the data transmitted by the master and the response signals of the slave or slaves arranged in the protected region can be transmitted via the respective data output of this transceiver to the respective data input of the other transceiver which is directly coupled with the slave or slaves in the unprotected region and which forwards these data to the slave or slaves in the protected region and so that the response signals of all slaves can be transmitted to the respective data input of the master via the respective output of this transceiver.

The two transceivers are advantageously connected to the master via only one serial interface. The master can include at least one microcontroller and this real interface can be associated with the microcontroller.

The data bus can in particular include a single supply bus system.

In a preferred practical embodiment of the local network in accordance with the invention, a LIN (local interconnect network) data bus is provided as the data bus.

The two transceivers are expediently made as LIN transceivers.

It is therefore ensured by a simple electronic circuit that data originating from a respective slave in the unprotected region can admittedly be transmitted via the data bus to the master, but not to any slave in the unprotected region. The two LIN transceivers only require a serial interface at the microcontroller, whereby additional hardware effort and software effort is avoided. The master transmits its data to a first of the two transceivers which in turn forwards them to the slaves in the protected region. Both the signals from the master and the response signals of the slaves in the protected region are available at a data output of the first transceiver and arrive at the second transceiver via this. The slaves in the unprotected region thus also receive all data. The response signals of all slaves are available at a data output of the second transceiver. Complete communication is thus possible. If a message is fed into the network from outside as a result of a manipulation at the slaves in the unprotected region, it is thus ensured that this message does not arrive at the slaves in the protected region. They are thus protected from non-authorized messages.

BRIEF DESCRIPTION OF THE DRAWINGS

The invention will be explained in more detail in the following with reference to an embodiment and to the drawings; there are shown:

FIG. 4 a functional diagram of an exemplary embodiment of a local network in accordance with the invention.

DETAILED DESCRIPTION OF THE PREFERRED EMBODIMENT

Figure 1:
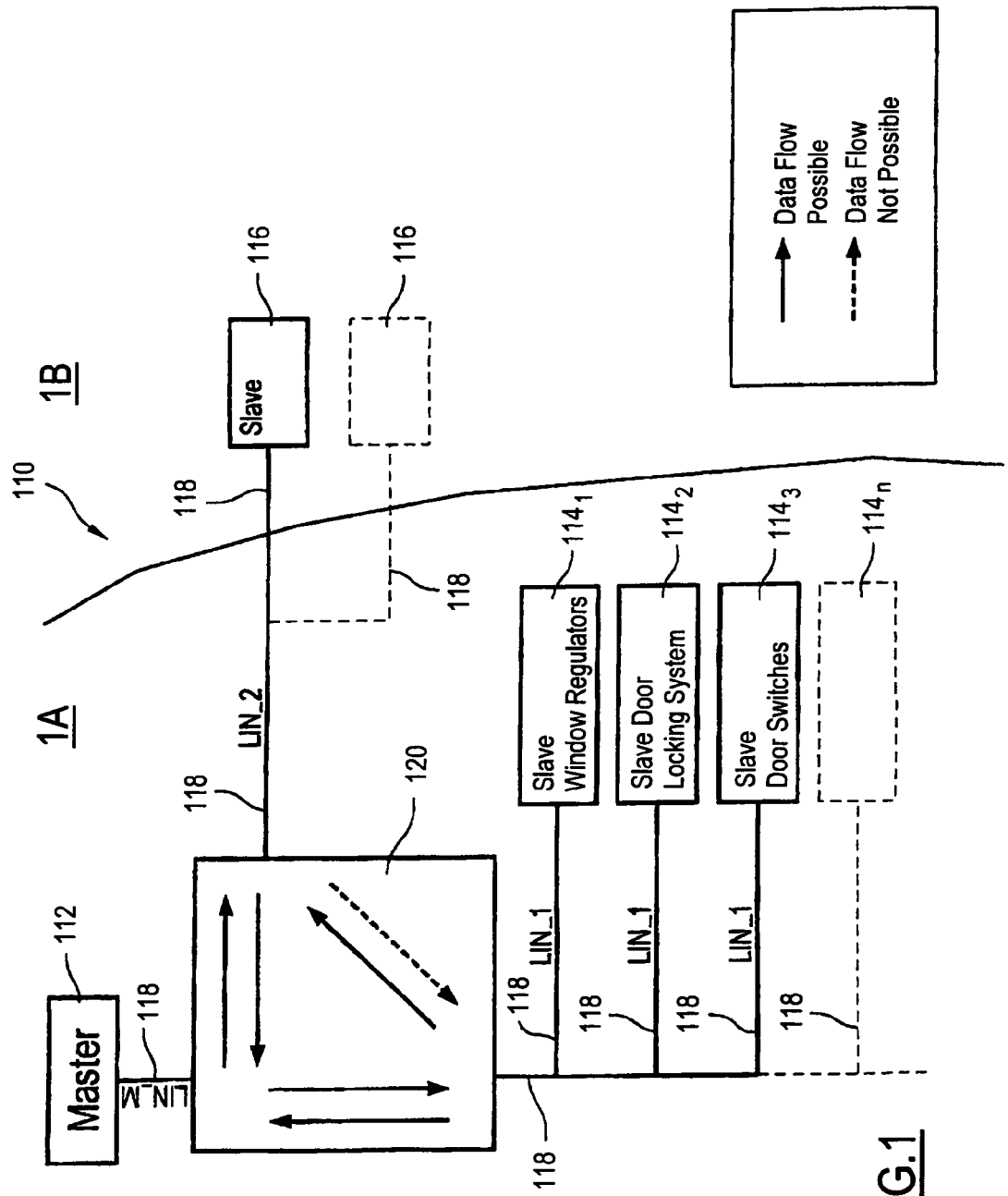
FIG. 1 a functional diagram of an exemplary embodiment of a local network.

FIG. 1 shows a functional diagram of an exemplary embodiment of the local network in accordance with the invention, with it being a local network for vehicles, for example, in the present case.

It includes at least one master and a plurality of slaves $114_i$, $116_i$. The slaves $114_i$, $116_i$ can be controlled by the master $112$ via a data bus $118$ which is, for example, provided as a LIN (local interconnect network) data bus in the present case.

As can be recognized with reference to FIG. 1, at least one slave $114_i$ is provided in a protected region 1A, here, for example, inside the vehicle, and at least one slave $116_i$ is provided in an unprotected region 1B, here, for example, outside on the vehicle.

A slave $114_1$ for the window regulators, a slave $114_2$ for the door locking system and a slave $114_3$ for the door switches, are indicated, for example, as slaves $114_i$ provided in the protected region 1A. Generally, further and/or other slaves $114_i$ can also be provided in the unprotected region 1A.

A slave $116_1$ for the outer mirror is indicated in FIG. 1 as a slave $116_i$ in the unprotected region 1B, with a respective slave $116_i$ of this type arranged in the unprotected region 1B being able to be provided for two side mirrors. A second slave $116n$ arranged in the unprotected region 1B is indicated by broken lines in FIG. 1.

The local network 110 is designed such that data originating from a respective slave $116_i$ in the unprotected region 1B can admittedly be transmitted via the LIN 118 data bus to the master 112, but not to any slave $114_i$ in the unprotected region 1A.

Respective bidirectional data traffic is possible between the slave $116_i$, $114_i$ and the master 112, irrespective of whether a respective slave $116_i$, $114_i$ is arranged in the unprotected region or in the protected region 1B and 1A respectively.

The corresponding control of the data flow is indicated in FIG. 1 by arrows contained in a block 120 between the master 112 and the slaves $114_i$, $116_i$. The continuous arrows indicate that an unimpeded data flow is possible in the respective direction, whereas the dotted arrow expresses the fact that no data flow is possible in the respective direction. Accordingly, a respective bidirectional data exchange is therefore possible between the master 112 and the slaves $114_i$ arranged in the protected region 1A and between the master 112 and the slaves $116_i$ arranged in the unprotected region 1B. A data exchange is moreover, for example, also permitted starting from the slaves $114_i$ arranged in the protected region 1A to the slaves $116_i$ arranged in the unprotected region 1B. A data exchange starting from the slaves $116_i$ arranged in the unprotected region 1B to the slaves $114_i$ arranged in the protected region 1A is precluded, in contrast (cf. the dotted arrow).

Figure 2:
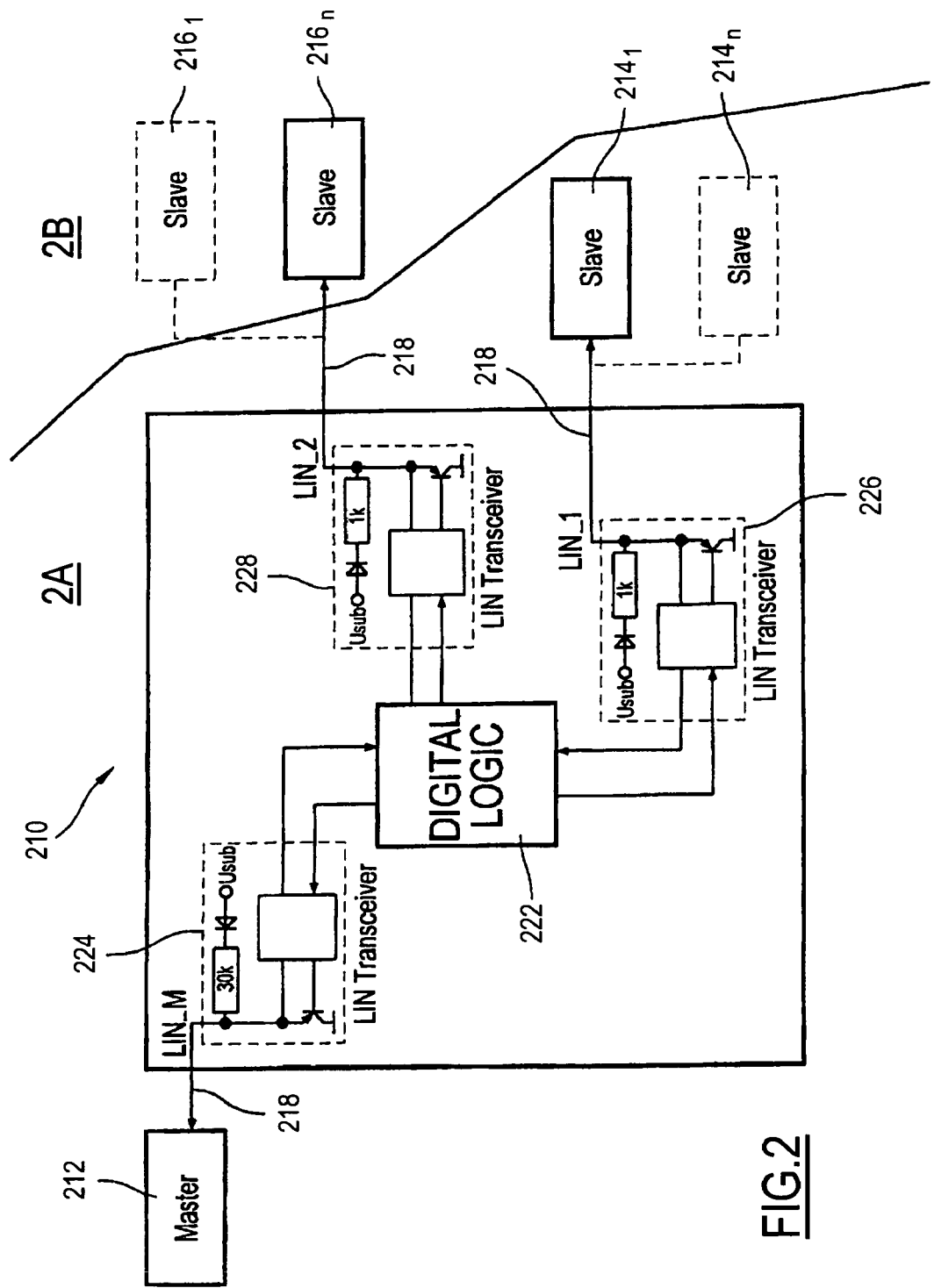
FIG. 2 a simplified circuit diagram of an exemplary embodiment of the local network.

In the embodiment reproduced in FIG. 2, the data flow between the master 212 and the different slaves $214_i$, $216_i$ is controllable via a logic circuit, in particular a digital logic circuit 222. This logic circuit 222 is designed such that a data flow starting from a respective slave $216_i$ in the unprotected region 2B to any slave $214_i$ in the protected region 2A is precluded.

As can be recognized with respect to FIG. 2, the logic circuit 222 in the present case is respectively coupled to the master 212, to one or more slaves $214_i$ in the protected region 2A and to one or more slaves $216_i$ in the unprotected region 2B via a transceiver 224, 226 or 228 respectively. The transceivers 224-228 in the present case are each LIN (linear interconnect network) transceivers.

A data flow starting from a respective slave $216_i$ in the unprotected region 2B to any slave $214_i$ in the protected region 2A is therefore prevented in the present case by the logic circuit, in particular the digital logic circuit 222. In another respect, the data flow can also again in particular be controlled by this logic circuit such as was described in connection with FIG. 1. A LIN data bus 218 is again also provided for the connection of the different units in the present case.

Figure 3:
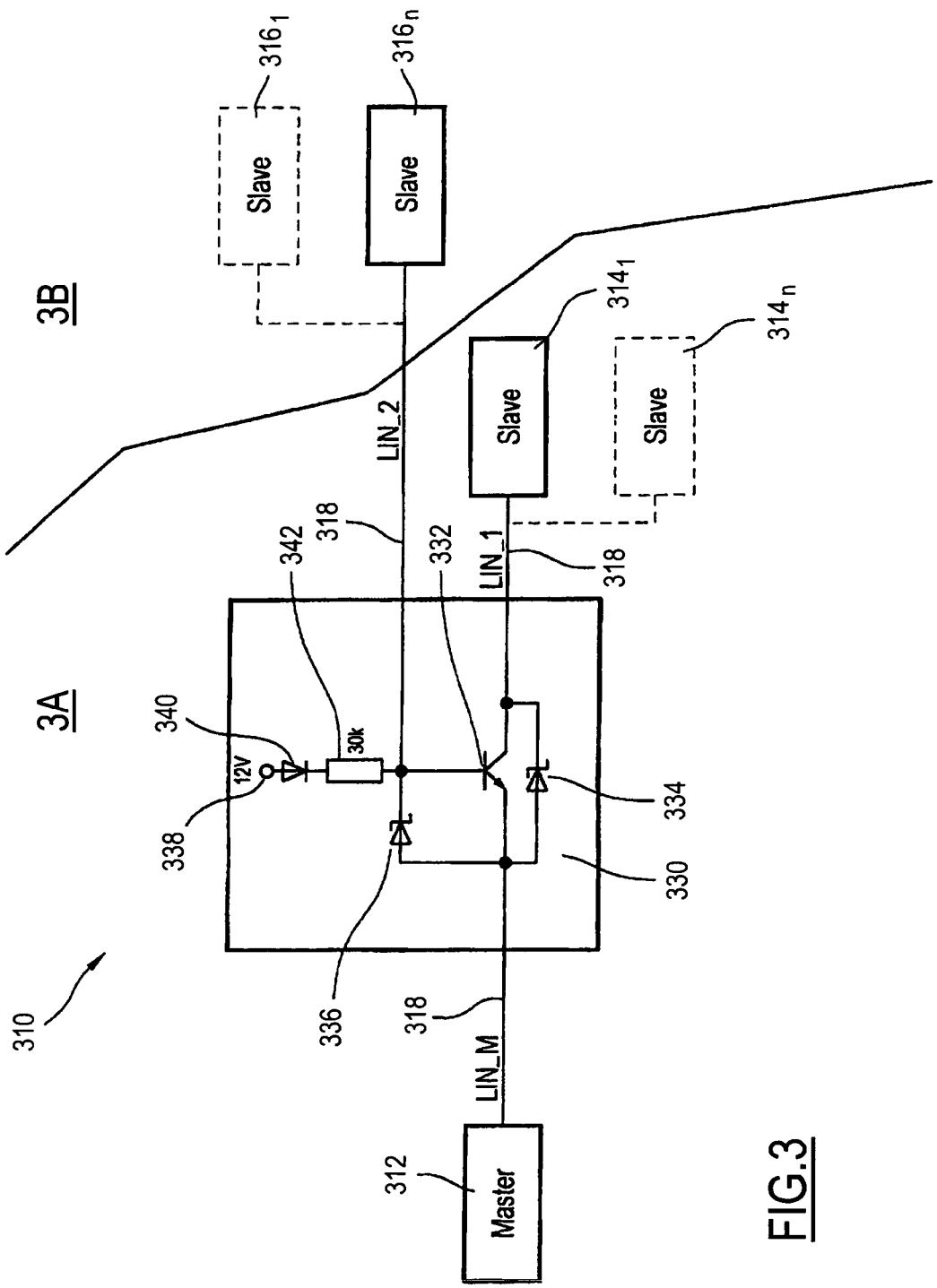
FIG. 3 a simplified circuit diagram of a further exemplary embodiment of the local network.

In the embodiment in accordance with FIG. 3, the master 312 is connected to at least one slave $314_i$ in the protected region 3A, on the one hand, and to at least one slave $316_i$ in the unprotected region 3B, on the other hand, via a simple electronic circuit 330. The coupling of the different elements again takes place via a LIN (local interconnect network) data bus.

The electronic circuit 330 is again designed such that a data flow starting from a respective slave $316_i$ in the unprotected region 3B to any slave $314_i$ in the protected region 3A is precluded.

The electronic circuit 330 can, for example, be integrated in a plug.

As can be recognized with reference to FIG. 3, the electronic circuit 330 in the present case includes, for example, a transistor 332, here for example a bipolar transistor, whose collector/emitter path is bridged by a diode 334 connected in the blocked direction and between whose emitter and base a further diode 336 is connected in the transmission direction. The positive terminal 338 of a voltage supply (e.g. 12 V) is connected to the base of the transistor 332 via a diode 340 connected in the transmission direction and a resistor 342. Under certain circumstances, a field effect transistor or the like can also be provided, for example, instead of a bipolar transistor.

The electronic circuit 330 is again coupled to the master 312, the slaves $314_i$ in the protected region 3A and to the slaves $316_i$ in the unprotected region 3B via a LIN (local interconnect network) data bus 318. In this connection, the emitter of the transistor 332 is connected to the master 312, the collector of the transistor 332 is connected to the slave or slaves $314_i$ in the protected region 3A and the base of the transistor 332 is connected to the slave or slaves $316_i$ in the unprotected region 3B. In another respect, the data flow can also again be controlled, for example, by this logic circuit 330 such as was described in more detail with reference to FIG. 1.

The block 120 in FIG. 1 can therefore, for example, include a logic circuit, in particular a digital logic circuit 222, in accordance with FIG. 2 or an electronic circuit 330 in accordance with FIG. 3. A bidirectional data traffic is possible between the master 112 and each slave $114_i$, $116_i$. A slave $116_i$ in the unprotected region can only transmit messages to the master 112, but not to further slaves $114_i$ in the unprotected region. The protected region is thus protected against manipulations from outside.

The practical embodiment in accordance with FIG. 2 includes three LIN (local interconnect network) transceivers 224-226 with a logic circuit, in particular a digital logic circuit 222, which forwards and/or controls the messages accordingly.

The embodiment in accordance with FIG. 3 represents a simple solution which can satisfy the condition with respect to the LIN protocol 2.0 with the exception that a slave-to-slave communication from the unprotected region to the protected region is precluded. In view of the minimal construction effort, the costs are correspondingly low, particularly as the electronic circuit 330 can be integrated, for example, in a plug.

Figure 4:
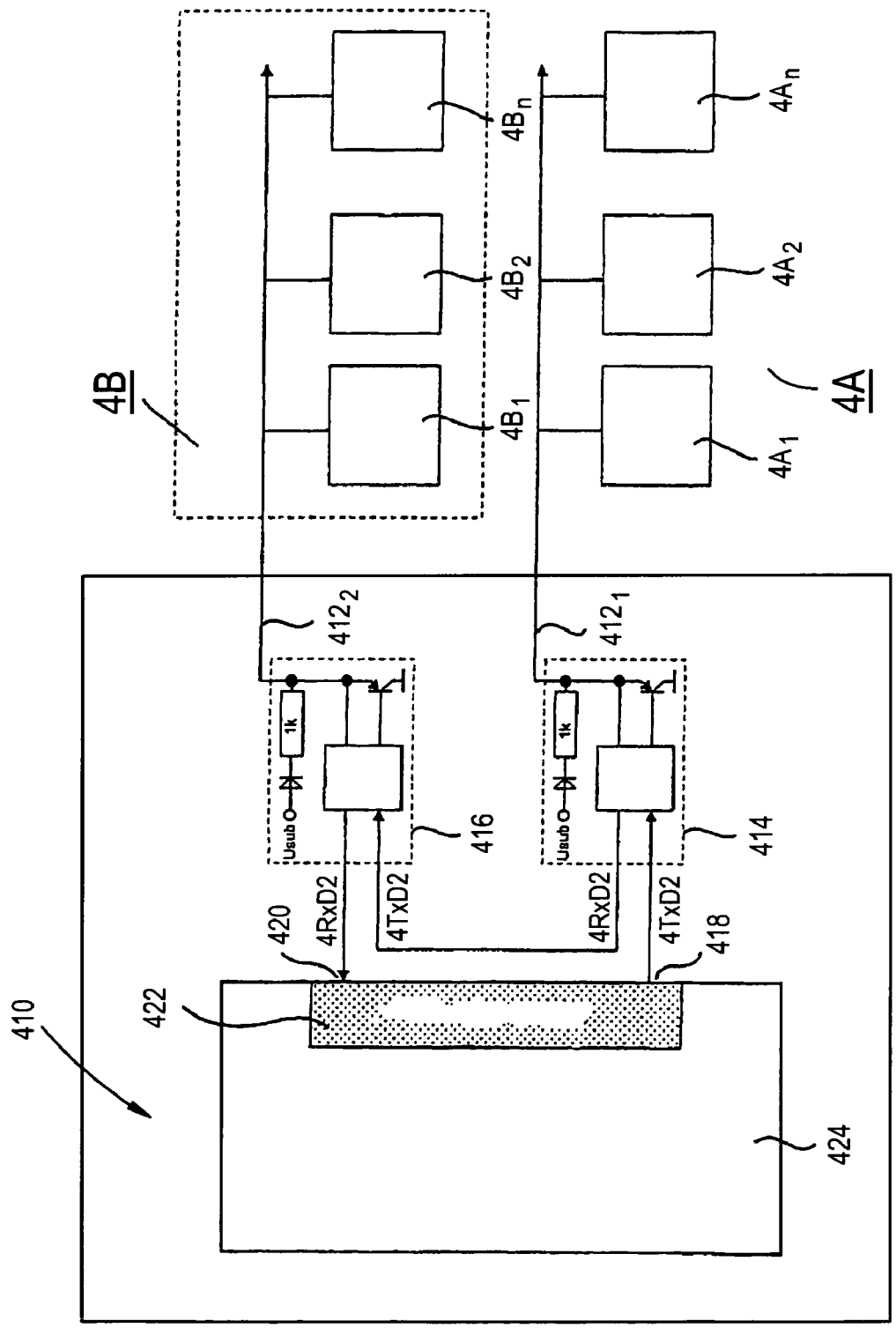
FIG. 4 a functional diagram of an exemplary embodiment of a local network.

FIG. 4 shows a functional diagram of an exemplary embodiment of the local network in accordance with the invention, with it being a local network for vehicles, for example, in the present case.

As shown in FIG. 4, in an exemplary embodiment, a local network includes at least one master 410 and a plurality of slaves $4A_i$, $4B_i$. The slaves $4A_i$, $4B_i$ can be controlled by the master 410 via a data bus 412 which is, for example, made as a LIN (local interconnect network) data bus in the present case.

As can be recognized with further reference to FIG. 4, at least one slave $4A_i$ is provided in a protected region 4A, here, for example, inside the vehicle, and at least one slave $4B_i$ is provided in an unprotected region 4B, here, for example, at the outside of the vehicle.

As shown in FIG. 4, a slave $4A_1$ for the central locking system, a slave $4A_2$ for the window regulators and a slave $4A_n$, e.g. for the door switches, are indicated by way of example in as slaves $4A_i$ in the protected region 4A. Generally, further and/or other slaves $4A_i$ can also be provided in the protected region 4A.

With continued reference to FIG. 4, slave $4B_1$ for the one side mirror and a slave $4B_2$ for the other side mirror are indicated, by way of example, as slaves $4B_i$ arranged in the unprotected region 4B, with at least one further slave $4B_n$ also being able to be provided, for example, in this unprotected region 4B.

As can be recognized with reference to FIG. 4, the master 410 is coupled with the slaves $4A_i$, $4B_i$ via two transceivers 414, 416, which are made as LIN (local interconnect network) transceivers in the present case, such that data originating from a respective slave $4B_i$ in the unprotected region 4B can admittedly be transmitted to the master 410, but not to any slave $4A_i$ in the protected region 4A.

As shown in FIG. 4, the master 410 is moreover coupled via the two transceivers 414, 416 with the slaves $4A_i$, $4B_i$ such that respective bidirectional data traffic is possible between the slaves $4A_i$, $4B_i$ and the master 410 irrespective of whether a respective slave $4A_i$, $4B_i$ is arranged in the protected region 4A or in the unprotected region 4B.

In accordance with the embodiment shown in FIG. 4, whereas the first transceiver 414 is coupled via a section $412_1$ of the LIN data bus 412 with the slaves $4A_i$ in the protected region 4A, the other transceiver 416 is coupled via a section $412_2$ of the LIN data bus 412 with the slaves $4B_i$ in the unprotected region 4B.

In accordance with this embodiment, the two transceivers 414, 416 are connected to one another such that data originating from a respective slave $4A_i$ in the protected region 4A can be transmitted to the slaves $4B_i$ in the unprotected region 4B, whereas a data flow originating from a respective slave $4B_i$ in the unprotected region 4B to any slave $4A_i$ in the protected region 4A is precluded.

As can be recognized with reference to FIG. 4, in the present case, a data output 418 of the master is connected to a data input 4TxD1 of the first transceiver 414 directly coupled with the slaves $4A_i$ in the protected region 4A. In addition, a data output 4RxD1 of this first transceiver 414 is connected to a data input 4TxD2 of the second transceiver 416 directly coupled with the slaves $4B_i$ in the unprotected region 4B. A data output 4RxD2 of this second transceiver 416 is in turn connected to a data input 420 of the master 410.

In accordance with this exemplary embodiment, the first transceiver 414 directly coupled with the slaves $4A_i$ in the protected region A forwards the data received at its data input 4TxD1 and transmitted by the master 410 to the slaves $4A_i$ in the protected region 4A. Both the data transmitted by the master 410 and the response signals of the slaves $4A_i$ arranged in the protected region 4A are then transmitted via the data output 4RxD1 of this first transceiver 414 to the data input 4TxD2 of the second transceiver 416 directly coupled with the slaves $4B_i$ in the unprotected region 4B. These data are forwarded to the slaves $4B_i$ in the protected region 4B. Finally, the response signals of all slaves $4A_i$, $4B_i$ are transmitted to the data input 420 of the master 410 via the output 4RxD2 of this second transceiver 416.

As can be recognized with reference to FIG. 4, the two transceivers 414, 416 are only connected to the master 410 via a serial interface 422 which, in the present case, is associated with a microcontroller 424 of the master 410.

The data bus 412 can include a single supply bus system and, as already mentioned, can in particular be made as a LIN (local interconnect network) data bus. The two transceivers 414, 416 are accordingly also provided as LIN transceivers.

It is thus ensured by a simple electronic circuit that data originating from a respective slave $4B_i$ in the unprotected region 4B can admittedly be transmitted via the data bus 412 to the master 410, but not to any slave $4A_i$ in the unprotected region 4A. The two LIN transceivers 414, 416 only require a serial interface 422 at the microcontroller, 424 so that no additional hardware effort and software effort arises. The master 410 transmits its data to the first transceiver 414 which in turn forwards them to the slaves $4A_i$ in the protected region 4A. Both the signals from the master 410 and the signals of the slaves $4A_i$ are available at the data output 4RxD1 of the first transceiver 414. They then arrive via this data output 4RxD1 at the data input 4TxD2 of the second transceiver 416 via which they are forwarded to the slaves $4B_1$ in the unprotected region 4B. The slaves $4B_i$ thus also receive all data.

The responses of all slaves $4A_i$, $4B_i$ are then available at the data output 4RxD2 of the second transceiver 416. They then arrive this data output at the data input 420 of the master 410. Complete communication is thus possible with the exception of a data flow from a respective slave $4B_i$ in the unprotected region 4B to any slave $4A_i$ in the protected region 4A. If a message is fed into the network from outside as a result of an unauthorized manipulation at the slaves $4B_i$ in the unprotected region, it is thus precluded that this message arrives at any slave $4A_i$ in the protected region. These slaves $4A_i$ are thus therefore protected against non-authorized messages.

What is claimed is:

1. A local network comprising at least one master and a plurality of slaves which can be controlled by the master via a data bus,
   wherein at least one slave is arranged in a protected region, and at least one slave is arranged in an unprotected region,
   wherein the master is coupled with the slaves via at least two transceivers such that data originating from a respective slave in the unprotected region can admittedly be transmitted to the master, but not to any slave in the protected region,
   wherein a data output of the master is connected to a data input of the one transceiver directly coupled with the slave or slaves in the protected region, a data output of this transceiver is connected to a data input of the other transceiver directly coupled with the slave or slaves in the unprotected region and a data output of this transceiver is connected to a data input of the master, and
   wherein the transceiver directly coupled with the slave or slaves in the protected region forwards the data received at its respective data input and transmitted by the master to the slave or slaves in the protected region; in that both the data transmitted by the master and the response signals of the slave or slaves arranged in the protected region can be transmitted via the respective data output of this transceiver to the respective data input of the other transceiver which is directly coupled with the slave or slaves in the unprotected region and which forwards these data to the slave or slaves in the unprotected region; and in that the response signals of all slaves can be transmitted to the respective data input of the master via the respective output of this transceiver.

2. A local network in accordance with claim 1, wherein the master is coupled via the two transceivers with the slaves such that respective bidirectional data traffic is possible between the slave and the master irrespective of whether a respective slave is arranged in the protected region or in the unprotected region.

3. A local network in accordance with claim 1, wherein one of the two transceivers is directly coupled with the slave or slaves in the protective region and the other transceiver is directly coupled with the slave or slaves in the unprotected region.

4. A local network in accordance with claim 3, wherein the two transceivers are connected to one another such that data originating from a respective slave in the protected region can be transmitted to the any slave in the unprotected region, whereby a data flow originating from a respective slave in the unprotected region to any slave in the protected region is precluded.

5. A local network in accordance with claim 1, wherein the two transceivers are only connected to the master via a serial interface.

6. A local network in accordance with claim 5, wherein the master includes at least one microcontroller and the serial interface is associated with the microcontroller.

7. A local network in accordance with claim 1, wherein the data bus includes a single supply bus system.

8. A local network in accordance with claim 1, wherein a local interconnect network data bus is provided as the data bus.

9. A local network in accordance with claim 8, wherein the two transceivers are made as LIN transceivers.

* * * * *